United States Patent

Ichikawa et al.

[11] Patent Number: 5,259,675
[45] Date of Patent: Nov. 9, 1993

[54] CERAMIC GUIDE PIN
[75] Inventors: Yukihito Ichikawa, Nagoya; Koji Fushimi, Gifu, both of Japan
[73] Assignee: NGK Insulators, Ltd., Nagoya, Japan
[21] Appl. No.: 838,908
[22] Filed: Feb. 21, 1992
[30] Foreign Application Priority Data
  Feb. 27, 1991 [JP] Japan .................. 3-55941
[51] Int. Cl.⁵ .................. B23K 11/14; F16C 17/00
[52] U.S. Cl. .................. 384/26; 219/86.24; 219/93; 384/907.1
[58] Field of Search .................. 219/93, 117.1, 86.24; 384/26, 7, 907.1, 913

[56] References Cited
U.S. PATENT DOCUMENTS

| | | | |
|---|---|---|---|
| 4,020,316 | 4/1977 | Schaft et al. | 219/93 X |
| 4,609,805 | 9/1986 | Tobita et al. | 219/93 |
| 4,789,768 | 12/1988 | Tobita et al. | 219/93 X |

FOREIGN PATENT DOCUMENTS 1224175  9/1989  Japan .................. 219/93

Primary Examiner—Thomas R. Hannon
Attorney, Agent, or Firm—Shea & Gould

[57] ABSTRACT

A ceramic guide pin having a guide portion, wherein at least the guide portion has a surface so shaped, microscopically, that top portions of outwardly projected portions of the surface are in the shape of gently curved surfaces. The ceramic guide pin can be produced by a process which comprises the steps of preparing a shaped body of a ceramic guide pin by forming or machining in dimensions calculated from the desired finished dimensions and a firing shrinkage allowance factor, sintering said shaped body, and subjecting the sintered body to barrel-polishing.

3 Claims, 4 Drawing Sheets

CERAMIC GUIDE PIN

BACKGROUND OF THE INVENTION

1. Field of the Invention

This invention relates to a ceramic guide pin which is used, for example, in a projection welding machine for welding small parts such as nuts to automobile bodies, panels, etc., and a process for producing the same.

2. Description of the Prior Art

As a method of attaching small parts, e.g. nuts, to an automobile body or the like, spot welding by a projection welding machine has been generally practiced.

In the method, the nut is first fitted into a tip portion of a guide pin projected from a central portion of a cylindrical electrode. The nut, thus fitted in the guide pin, and a panel (vehicle body) are clamped between upper and lower electrodes, whereby the nut is welded to the panel. In this case, the guide pin is electrically insulated to prevent arcing, which would otherwise occur between the guide pin and the nut with the result of depletion of material through melting.

Metallic guide pins ordinarily used for this purpose are insulated by an $Al_2O_3$ coating formed thereon by an oxidizing treatment or flame spraying. Such metal guide pins are poor in wear resistance, because the surface layers of the guide pins have a low hardness, for example, a knoop hardness of the order of a few GPa. Therefore, the insulation film on the metal guide pins are liable to be exfoliated by friction, galling or the like during the nutguiding operations, resulting in insulation failure. Accordingly, such guide pins must be replaced after a relatively short time of use.

When the nut fitted into the guide pin is inclined, in addition, the nut will be pressed as it is, namely, while remaining in partial contact with the guide pin, because the guide surface of the metallic guide pin has a very coarse surface roughness of Rmax 30 to 35 $\mu m$ and poor slidability. Even though the guide pin may not snap, the pin portion in contact with the nut may be dented or the insulation film may be exfoliated due to galling by a corner portion of the nut, resulting in failure of insulation. This causes the nuts to be welded to the panel in the inclined condition or with deviations from the intended position, leading to frequent occurrence of defective nut welding. In such a situation, the guide pin becomes unusable, even if not snapped.

In view of the above, ceramic-made guide pins which, though brittle, have a high hardness, e.g. a knoop hardness of 14 to 16 GPa, together with excellent insulating properties and heat resistance, have been proposed recently.

The present inventors also have proposed, in Japanese Patent Laid-open (Kokai) No. 1-224175, a ceramic-made guide pin having an endurance (the number of use cycles endured) of not less than 50,000, which is several times higher than those of metal-made guide pins.

However, the ceramic guide pins proposed in the Japanese Patent Laid-open No. 1-224175, though superior to metallic guide pins in endurance by a factor of from 2 to 5, have not necessarily been profitable industrially, because the manufacturing cost of the ceramic guide pins is as high as about 25 times that of the metallic guide pins.

The major cause of the higher production cost of ceramic guide pins is the grinding step subsequent to sintering. Namely, the production of the ceramic guide pins requires a precision finish by a diamond grinding wheel, leading to a long processing time and low productivity, or poor mass-producibility.

SUMMARY OF THE INVENTION

This invention contemplates overcoming the foregoing difficulties associated with the prior art.

It is accordingly an object of this invention to provide a ceramic guide pin which has an improved endurance while retaining good property for sliding of nuts thereon, can be manufactured at high efficiency and is suited to use in projection welding, and a process for producing the same.

This invention provides a ceramic guide pin comprising a conical guide portion, and a cylindrical trunk connected to the guide portion, wherein at least said guide portion has a surface so shaped, microscopically, that top portions of outwardly projected portions of said surface are in the shape of gently curved surfaces.

In the ceramic guide pin according to this invention, it is preferable that at least those top portions of the outwardly projected portions which are to be brought into contact with the nut are in the shape of gently curved surfaces, for better slidability of nuts on the guide pin. Accordingly to this invention, further, the surface of the guide portion of the ceramic guide pin is preferably so shaped that, when the surface roughness of the guide portion is measured along the sliding direction of the nut, the surface exhibits a center line depth Rp of 3 $\mu m$ or below. The "shape of gently curved surfaces" of the top portions of the projected portions means that the top portions have a gently curved surface profile, not only as viewed in the axial direction of the guide pin but also as viewed in any other direction.

In addition, according to this invention, there is provided a process for producing a ceramic guide pin, comprising the steps of preparing a shaped body of a ceramic guide pin by forming or machining in dimensions calculated from the desired finished dimensions and a firing shrinkage allowance factor, sintering said shaped body, and subjecting the sintered body to barrel polishing.

Generally, machine work applied to the shaped body is carried out on a lathe or by a cutting tool, whereon the machining marks should be removed with sandpaper or dry cloth.

The ceramic guide pin according to this invention exhibits improved endurance, while maintaining good nut slidability characteristics. The ceramic guide pin of this invention is suitable for use in projection welding of nuts, and can be manufactured at high production efficiency.

The ceramic guide pin referred to in this invention includes those parts which have the same function but may practically be given a different name, such as positioning pin, welding jig, etc.

The above and other objects and advantages of this invention will become apparent from the following detailed description and appended claims, taken in conjunction with the accompanying drawings.

BRIEF DESCRIPTION OF THE DRAWINGS

In order to simplify the grinding step subsequent to sintering, the present inventors made studies as to the finish, or surface roughness (Rmax), of the ground surfaces of ceramic guide pins and the endurance of the guide pins. As a result of the studies, the present inventors have found that the surface roughness and the endurance are not in proportional relationship.

Figure 1:
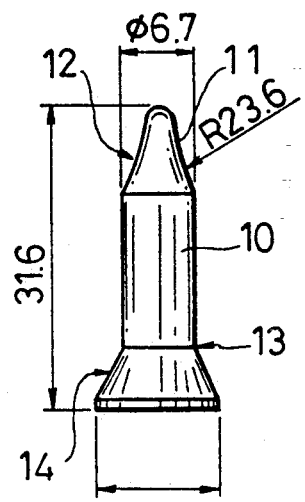
FIG. 1 is a side view of an example of ceramic guide pin.

More in detail, a ceramic guide pin 10 which had been snapped in use was found fractured along a line extending obliquely downward from a tapered portion 11 of the guide portion 12 (See FIG. 1). This fact shows that if the nut remains inclined without sliding into the proper position on the guide portion 12 of the guide pin, the nut makes partial contact with the guide pin under the pressing by the electrode, resulting in fracture of the guide pin. In FIG. 1, 13 denotes a base corner (corner radius 1 mm or more) and 14 denotes a tapered base.

Further investigations made by the present inventors have revealed that the endurance of the ceramic guide pin does not depend on the surface roughness of the pin but on the gentleness or smoothness of curvature of the surfaces of the pin. It follows that a precision finishing to bring the surface roughness of the ceramic guide pin to or below a predetermined level is not needed, in carrying out the grinding step after sintering; rather, it is important to give such a polish as to secure a gentleness of curvature of the guide pin surface, thereby enabling the nuts to slide easily on the guide pin. The term "surface roughness" used herein refers to the surface roughness measured on the guide surface of the guide pin along the axial direction of the guide pin, namely, along the direction in which the nut is driven.

As has been described above, this invention is based on the finding that the breakage of a ceramic guide pin in use in due to the nut being inclined and coming into partial contact with the guide pin, instead of sliding smoothly on the guide pin, when the nut is pressed by the electrode of a projection welding machine.

It is well known to those skilled in the art that the closer the surface roughness of the ceramic guide pin to a specular finish, the smaller the frictional resistance between the guide pin and a nut, hence the smoother the sliding of the nut on the guide pin. It has been found, however, that there is little difference in nut slidability between a specular-finished guide pin having a surface roughness of Rmax 0.1 $\mu$m or below and a barrel-polished guide pin having an Rmax value of about 3 to 9 $\mu$m, as will be shown in Example below.

Figure 2:
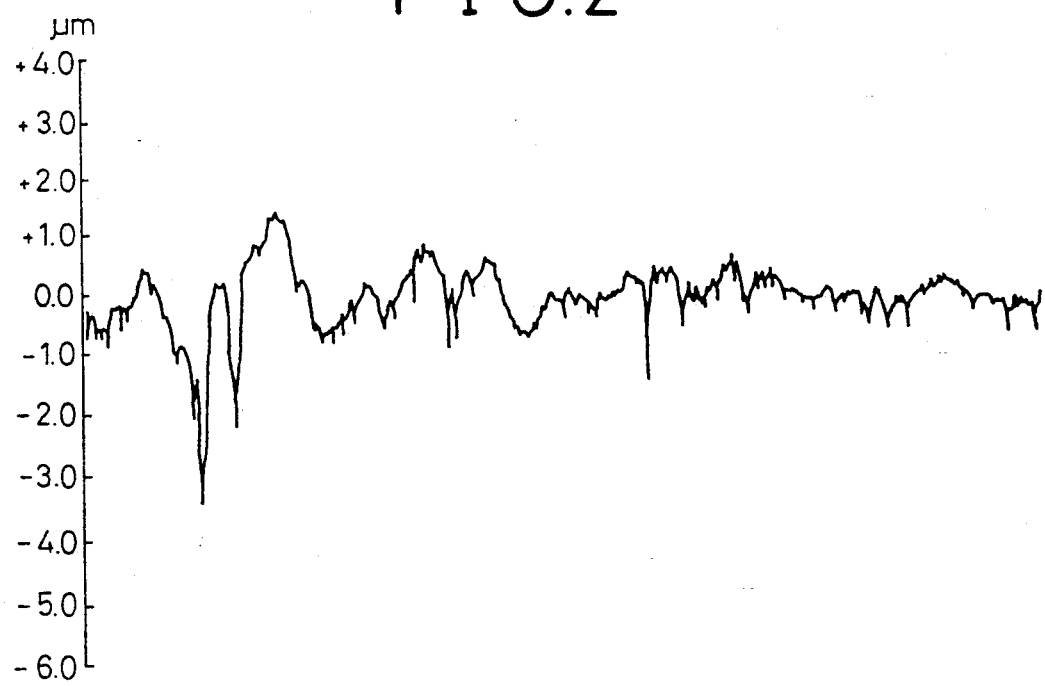
FIG. 2 is a graph showing an example of surface roughness curve for a ceramic guide pin according to this invention.
Figure 3:
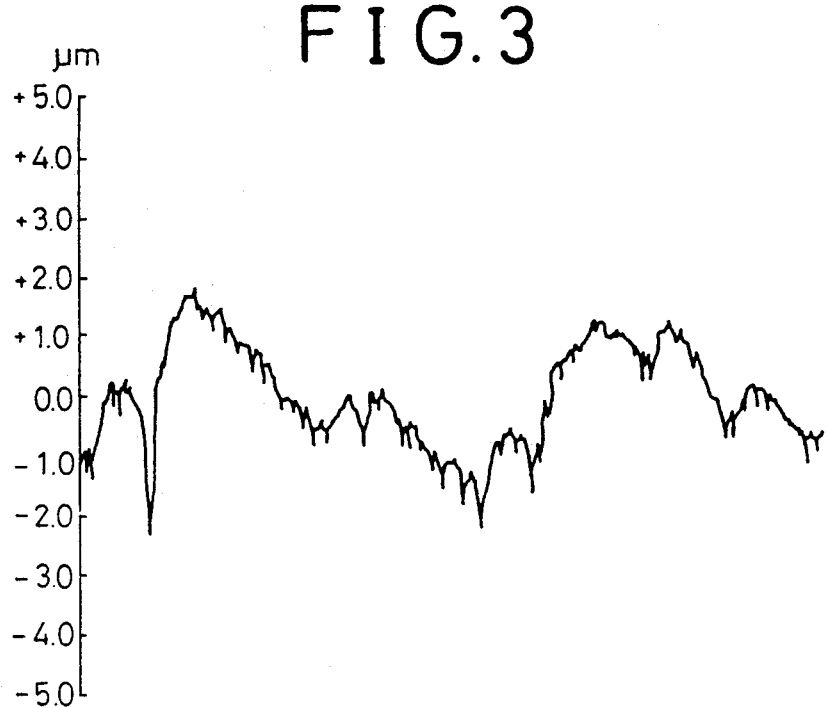
FIG. 3 is a graph showing another example of surface roughness curve for a ceramic guide pin according to this invention.
Figure 4:
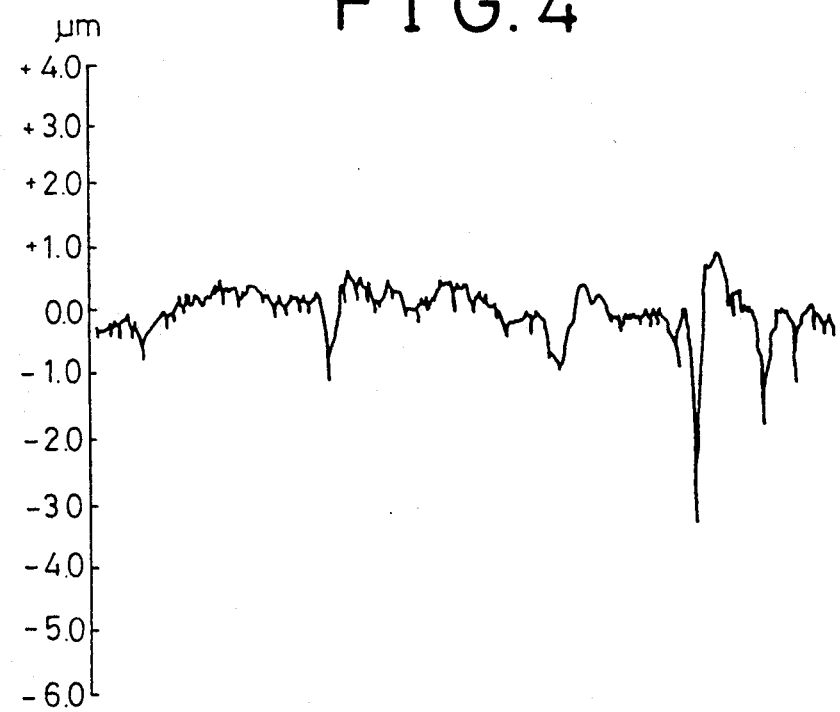
FIG. 4 is a graph showing a further example of surface roughness curve for a ceramic guide pin according to this invention.

More in detail, it has been found that, when the surface shape of a ceramic guide pin is viewed microscopically, surface roughnesses which are different from each other but are not exceeding a predetermined value, as shown in FIGS. 2 to 4, will give substantially the same level of good results as to nut slidability characteristics, provided that the top portions of outwardly projected portions of the surface are formed in the shape of gently curved surfaces.

Furthermore, according to this invention, a shaped body of a ceramic guide pin is prepared in dimensions calculated from the desired finished dimensions and a firing shrinkage allowance factor, then the shaped body is sintered, and the sintered body is subjected to barrel polishing. By the process according to this invention, it is possible to produce ceramic guide pins at enhanced production efficiency and improved mass-producibility, while maintaining nut slidability characteristics.

When the ceramic guide pins obtained according to this invention are used for projection welding of nuts, the frequency of defective welding of nut is reduced and the guide pins show improved endurance. It is therefore possible, according to this invention, to enhance productivity in projection welding of nuts, to reduce the frequency of guide pin replacement, and to reduce maintenance cost.

This invention will now be explained more in detail with reference to the following example, which is not to be construed as limiting this invention.

EXAMPLE 1

A granulated $Si_3N_4$ powder admixed with sintering aids, such as yttria and magnesia, was formed into a cylindrical shape by a rubber press under a pressure of at least 1 ton/cm$^2$. The cylindrically shaped body was cut on a lathe into a guide pin shape (for M6) (height: 31.6 mm, diameter: $\phi$6.7 mm, radius of guide portion 12: 23.6 mm, diameter of tapered base 14: $\phi$12 mm), as shown in FIG. 1, predetermined with an allowance for sintering shrinkage. The thus shaped body was finished with sandpaper until machining marks were completely removed from the surfaces thereof, particularly the guide surface thereof. After the binder was removed from the sandpaper-finished body, the body was fired at 1700° C. in a nitrogen atmosphere. The ceramic guide pin thus sintered had substantially the same shape as metal-made guide pins except that a base corner 13 was cut to have a corner radius of at least 1 mm, in order to enhance structural strength against mechanical shocks caused by collision of a work (nut).

Next, 50 sintered ceramic bodies having the above predetermined guide pin shape were placed into a 7.5-liter hexagonal-based tubular vessel made of stainless steel. Then, the vessel was filled additionally with alumina ball media, 3 to 5 mm in diameter, to 60% of the internal volume of the vessel, and further with water to 80% of the internal volume. After addition of a trace amount of surfactant, the vessel was closed and set on a centrifugal barrel polishing machine, a product by Tipton Mfg. Corp. The vessel was rotated at a rate of 150 to 200 rpm for at least 10 minutes, thereby barreling the guide pins.

The $Si_3N_4$-made barreled guide pins thus obtained were used in projection welding of nuts, which was carried out in the same manner as described in Japanese Patent Laid-open No. 1-224175. Concurrently, conventional metal guide pins (KCF) and $Si_3N_4$-made guide pins provided with varying surface roughnesses by machine work after sintering, were also used for nut welding in the same manner.

The average frequency of defective nut welding per 10,000 cycles and the guide pin life determined by electrocorrosive wear, deformation, fracture or the like were tested on the above guide pin specimens, by stopping the welding system every 10,000 cycles of test welding to check the guide pins for damages. The results are set forth in Table 1 below.

TABLE 1

| Material | Surface Treatment | Frequency of defective nut welding | Endurance (Life) | Surface roughness of guide surface (μm) Rmax | Surface roughness of guide surface (μm) Rp | Gentleness of projected top | Cost | Total rating |
|---|---|---|---|---|---|---|---|---|
| This invention | | | | | | | | |
| $Si_3N_4$ | Barreling | 1 | >150,000 cycles | 3~9 | 1~3 | ◯ | ◯ | ◯ |
| Comparative Example | | | | | | | | |
| Metal (KCF) | — | 18 | 20,000–50,000 cycles | 30~35 | 15~20 | X | ◎ | X |
| $Si_3N_4$ | Untreated (As-sintered) | 10 | 100,000–120,000 cycles | 7~11 | 3~5 | X | ◯ | X |
| $Si_3N_4$ | #240 Grinding + Barreling | 5 | 70,000–100,000 cycles | 5~7 | 2~4 | Δ | Δ | Δ |
| $Si_3N_4$ | #400 Grinding | 2 | >150,000 cycles | 2~3 | 1~2 | Δ | Δ | Δ |
| $Si_3N_4$ | Specular finishing (Buffing) | 0 | >150,000 cycles | <0.1 | <0.05 | ◎ | X | X |

◎ → ◯ Δ → X
good → bad

The metal guide pins according to the prior art exhibited a high frequency of defective nut welding, and had an endurance limit of 20,000 to 50,000 cycles. On the other hand, the $Si_3N_4$-made guide pins according to this invention rarely showed defective nut welding, and the endurance of the guide pins was so high that no damages were observed on the guide pins after 150,000 cycles of welding. Also, the $Si_3N_4$ guide pins of this invention was found to be comparable to the $Si_3N_4$-made #400-finished guide pins and specular-finished guide pins, with respect to frequency of defecting nut welding (about 1/10 times that for the metal guide pins) and endurance (at least 3 times that of the metal guide pins).

For the purpose of a further reduction in production cost, the foregoing production process was repeated in the same manner except for omitting the barrel polishing step, to produce $Si_3N_4$ guide pins the surfaces of which were entirely in the as-fired condition. When tested, the as-fired $Si_3N_4$ guide pins showed a higher frequency of defective nut welding and a poorer endurance, as compared to the barrel-polished $Si_3N_4$ guide pins. It is seen from the results that a higher frequency of defective nut welding corresponds to a higher frequency of inclination and positional deviation of the nuts, which, in turn, means that partial contact of the nut with the guide pin under pressure occurs more frequently, leading to a reduced endurance of the guide pin.

The surface roughness of guide portions of the above guide pins was measured on a Form Talysurf, a product by Rank Taylor Hobson K.K. The metal guide pins had a surface roughness Rmax of 30 to 35 μm, indicating a very rough surface, whereas the as-fired $Si_3N_4$ guide pins had an Rmax value of 5 to 11 μm, the barreled $Si_3N_4$ guide pins had an Rmax of 3 to 9 μm, the #400-finished $Si_3N_4$ guide pins had an Rmax of 2 to 3 μm, and the specular-finished $Si_3N_4$ guide pins had an Rmax of 0.1 μm or below. Although the barreled $Si_3N_4$ guide pin products were rougher in surface finish than the specular-finished products by 3 to 9 μm in terms of Rmax, the two kinds of guide pins showed comparable performance as guide pin. On the other hand, a decided difference in guide pin performance was observed between the as-fired products and the barreled products, in spite of the slight Rmax difference of only about 2 μm between the two types. It is evident from these results that the guide pin performance is not determined by the surface roughness Rmax alone.

Taking the above into account, the present inventors made further detailed investigations of the surface roughness curves and the like, to get more findings, as follows.

Figure 5:
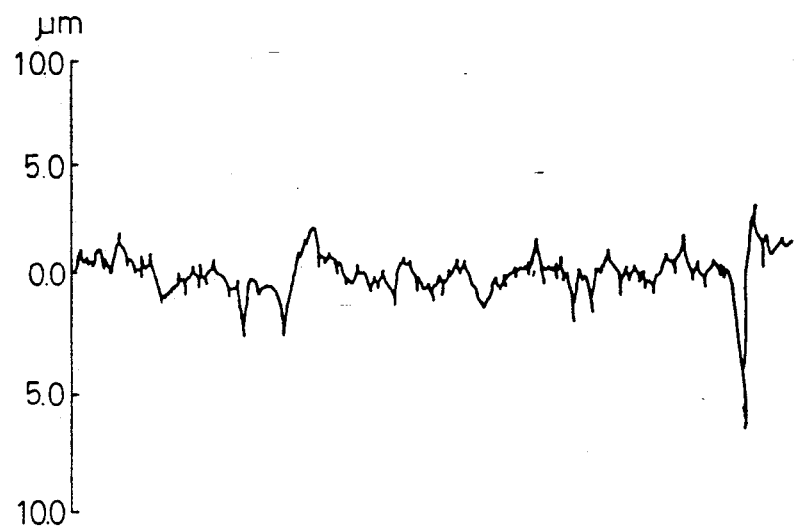
FIG. 5 is a graph showing an example of surface roughness curve for a ceramic guide pin having firing-finished surfaces.
Figure 6:
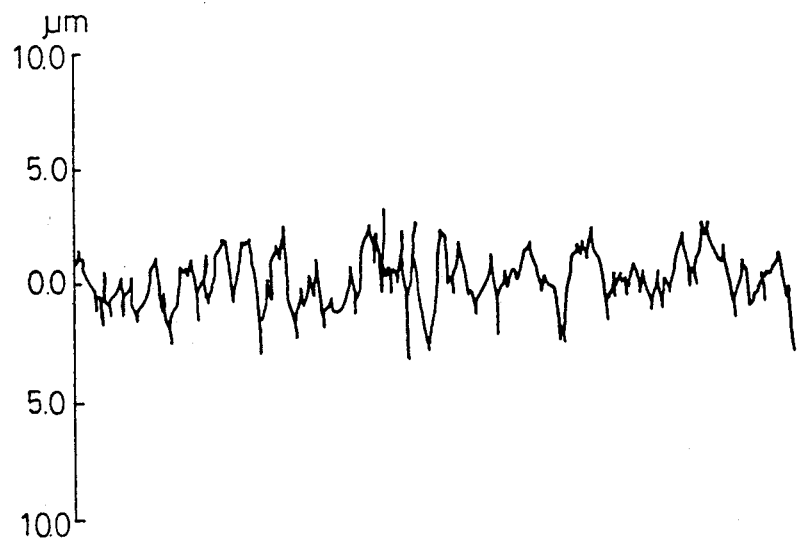
FIG. 6 is a graph showing another example of surface roughness curve for a ceramic guide pin having firing-finished surfaces.
Figure 7:
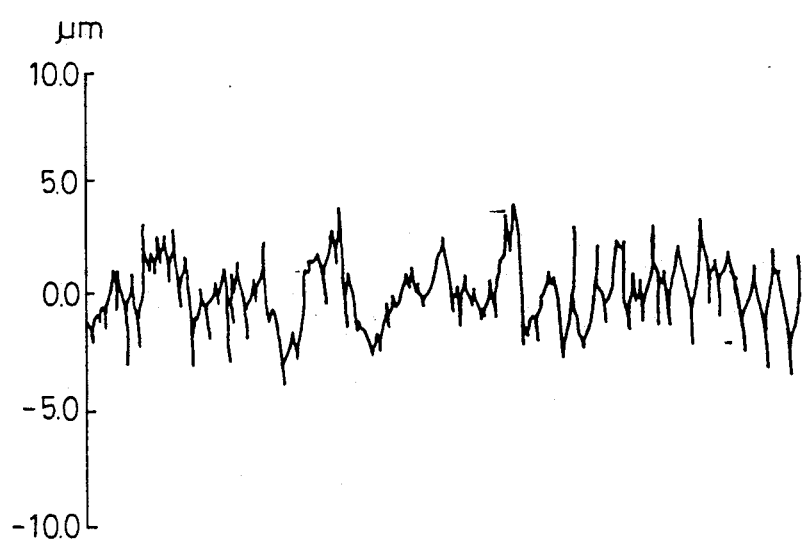
FIG. 7 is a graph showing a further example of surface roughness curve for a ceramic guide pin having firing-finished surface.

The roughness curves of the as-fired guide pin products were compared with the roughness curves of the barreled products. As is seen from FIGS. 2 to 4 (this invention) and FIGS. 5 to 7, peaks (outwardly projected portions) of the roughness curves of the as-fired products had a multiplicity of minute protrusions so as to appear as rugged peaks, whereas in the roughness curves of the barreled products the peaks had a smoothly curved shape because minute protrusions were rounded off at the top ends thereof. It was further found that the coefficient of static friction between the barrel-polished surface and a nut was about one-half that between the as-fired surface and the nut.

In short, sliding of a nut on the guide surface of a guide pin is affected only by the peak portions of the roughness curve of the guide surface, and is independent of the valley portions of the roughness curve. In other words, the surface roughness Rmax of the guide surface has no relation to the slidability of the nut on the guide surface. It has thus been found that the nut slidability is influenced only by the height of peaks, or the portions above the center line, of the roughness curve, which is represented in terms of surface roughness Rp (center line depth), and by the shape of the peaks, namely, smoothness of curvature of the peaks; therefore, precision finish such as #400 polishing or specular polish is not necessary for good slidability of nuts.

For further elucidating the relationship between the nut slidability and surface roughness Rp, guide pins prepared by treating sintered $Si_3N_4$ compacts with #240 diamond grinding wheel followed by barreling were used in projection welding of nuts. In spite of the finer finish of the guide pins, the frequency of defective nut welding was rather worsened to two times that with the as-fired guide pins. The guide surfaces obtained by the #240 treatment followed by barrelling had a surface roughness represented by an Rp value of 2 to 4 μm and an Rmax value of 5 to 7 μm. On the other hand, the barrel-polished guide pins had an Rp of 1 to 3 μm, and the as-fired guide pins had an Rp of 3 to 5 μm. Consequently, it is preferable that the height of peaks of the roughness curve, as represented by Rp, is not more than 3 μm. To this conclusion, of course, the gentle curvature of top portions of the peaks as described above is prerequisite.

Ground or specular-finished ceramic guide pins are not practicable industrially, because of their high cost of at least about 25 times that of metal guide pins. On the other hand, the ceramic guide pin according to this invention can be manufactured at a comparatively low cost, about 2 to 4 times that of the metal guide pins. Such level of production cost is sufficiently feasible on an industrial basis, and, taking into account the markedly reduced frequency of defective nut welding and the improved endurance, the ceramic guide pins of this invention obviously have an ample advantage over the metal guide pins.

What is claimed is:

1. A ceramic guide pin comprising:
   a conical guide portion, and
   a cylindrical trunk connected to the guide portion, wherein at least said guide portion has a surface so shaped, microscopically, that top portions of outwardly projected portions of said surface are in the shape of gently curved surfaces.

2. The ceramic guide pin as set forth in claim 1, wherein at least those top portions of said outwardly projected portions which are to be brought into contact by a nut are in the shape of gently curved surfaces.

3. The ceramic guide pin as set forth in claim 1, wherein said surface of said guide portion has a surface roughness in terms of center line depth Rp of 3 μm or below, the surface roughness being measured along the direction of sliding of a nut on said surface.

* * * * *